United States Patent [19]

Hepworth et al.

[11] 4,349,059

[45] Sep. 14, 1982

[54] BLADE HOLDERS

[75] Inventors: Paul S. Hepworth; Martin G. Whitehouse, both of Leicester, England

[73] Assignee: Plas Plugs Limited, Derby, England

[21] Appl. No.: 264,412

[22] Filed: May 15, 1981

[30] Foreign Application Priority Data

May 27, 1980 [GB] United Kingdom ................. 8017329

[51] Int. Cl.$^3$ ............................................. B27B 21/02
[52] U.S. Cl. ................................................. 145/33 A
[58] Field of Search .................. 145/33 A, 33 R, 35 E

[56] References Cited

U.S. PATENT DOCUMENTS

| 766,077 | 7/1904 | Tilden | 145/33 A |
| 1,080,365 | 12/1913 | O'Neill et al. | 145/33 A |
| 1,187,460 | 6/1916 | Jull | 145/33 A |
| 1,517,827 | 12/1924 | De Grado | 145/33 A |

FOREIGN PATENT DOCUMENTS

| 212365 | 3/1924 | United Kingdom | 145/33 A |
| 433291 | 8/1935 | United Kingdom | 145/33 A |
| 446727 | 5/1936 | United Kingdom | 145/33 A |

Primary Examiner—Stephen G. Kunin
Assistant Examiner—J. T. Zatarga
Attorney, Agent, or Firm—Darby & Darby

[57] ABSTRACT

The invention relates to a blade holder of the hacksaw type which comprises a C-shaped portion spanned by a blade having a conventional pair of projections being receivable in a slot having a cruciform or T-slot in one arm of the C-shape and the other pair in a similar slot formed in a lever pivotted to the other arm. Movement of the lever from a loading position to an operative position imparts tension to the blade and in the example shown, involves movement into an over-center condition of the lever with respect to its pivotal mounting. The lever has an abutment surface projecting outwardly from its end portion adjacent the pivotal mounting so as to contact the second arm member when the lever is in its loading position to thereby act as an end stop.

3 Claims, 7 Drawing Figures

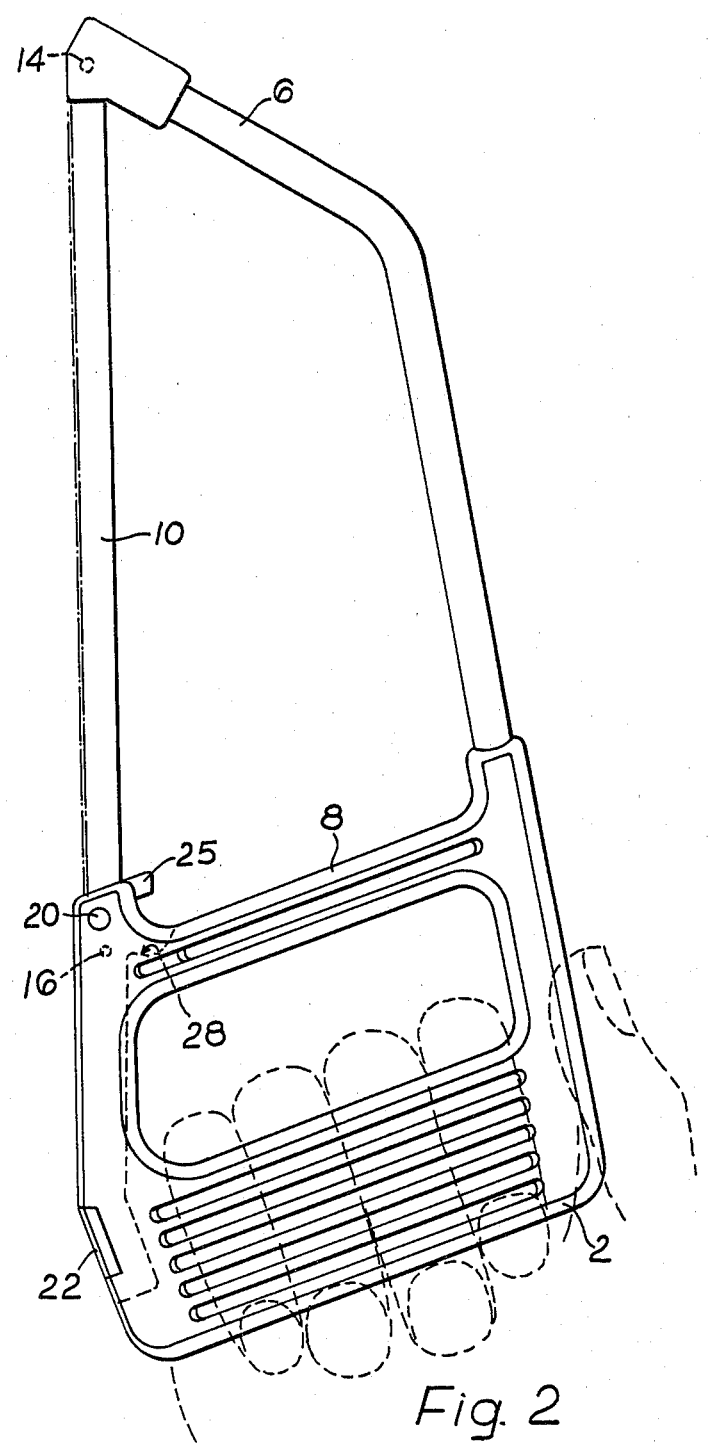
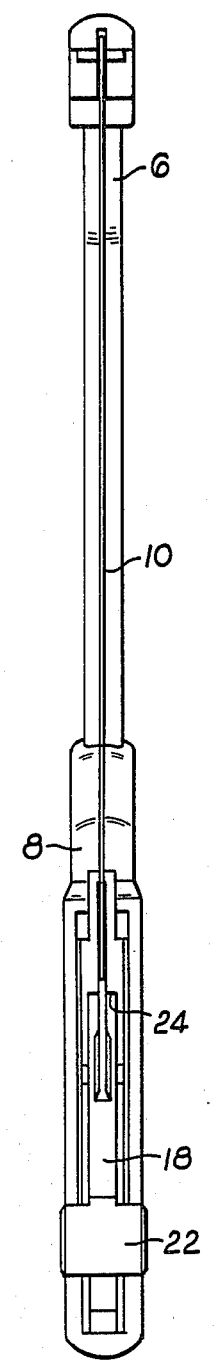
Fig. 2
Fig. 3

BLADE HOLDERS

BACKGROUND OF THE INVENTION

The invention is concerned with improvements in or relating to blade holders, in particular holders in which the blade is mounted to span a portion of the holder and held in position under tension.

Blade holders of this type are conveniently used for saw-toothed blades and it is often only with difficulty that the blade is mounted across the span of the holder and secured in position. Such mounting frequently involves exerting manual pressure on the holder temporarily to reduce the length of the span while the blade is inserted.

BRIEF SUMMARY OF THE INVENTION

The invention provides a blade holder for use with a strip blade arranged to span a C-shaped portion of the holder and having an opposed pair of mounting projections provided at each of its two end portions, wherein the C-shaped portion comprises two arm members, a first arm member being provided with a T-slot to receive the projections of a first end portion of the blade and a second arm member being provided with a pivot mounting on which is mounted one end of a pivotal lever, said lever being provided with a T-slot inwardly spaced from its mounting and into which are inserted the projections of the second end portion of the blade when the lever is in a first, loading position, the construction and arrangement being such that movement of the lever from its first position into a second, operating position, causes the distance between the T-slot of the first arm member and the T-slot of the lever to increase, thereby enabling tension to be imparted to the blade.

Advantageously, the movement of the lever into its second position involves the arcuate movement of the projections of the second end of the blade into an over-centre condition with respect to the pivot mounting of the lever, the arcuate movement of the blade being described about the projections of the first-end portion of the blade, received in the first-mentioned T-slot.

BRIEF DESCRIPTION OF THE DRAWINGS

There will now be described an example of a blade holder according to the invention. It will be understood that the description, which is to be read with reference to the drawings, is given by way of example only and not by way of limitation.

In the drawings:

FIG. 2 shows a similar view but with the blade fitted and tensioned;

FIG. 3 is a side view of the holder and blade of FIG. 2;

DETAILED DESCRIPTION OF THE DRAWINGS

Figure 1:
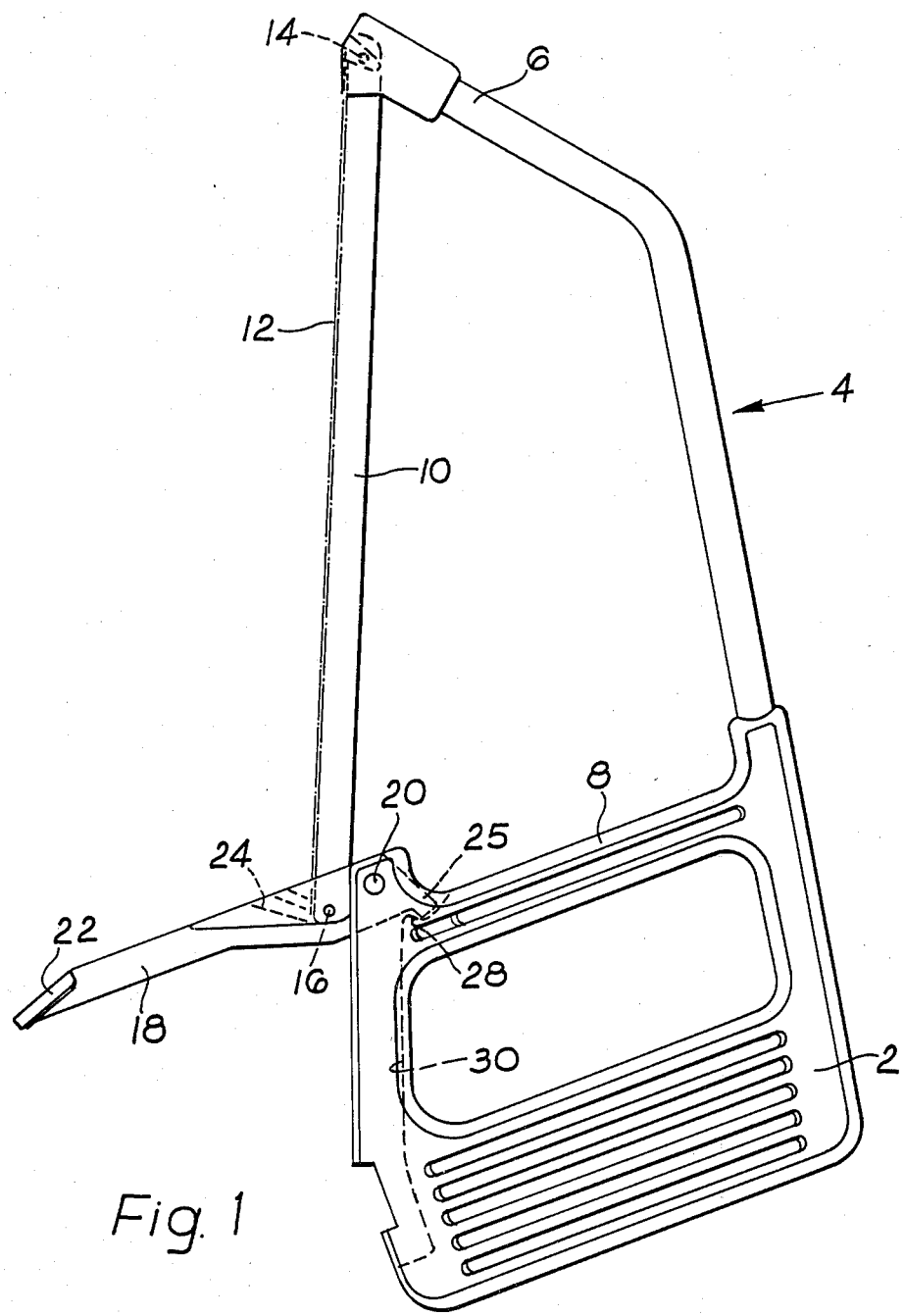
FIG. 1 shows a plan view of the blade holder with a blade in a loading position.

The Figures show a small blade holder of the kind sometimes known as a hacksaw. The holder comprises a handle 2 and a C-shaped portion 4 comprising a first arm portion 6 and a second arm portion 8. A conventional blade 10 is illustrated, having a serrated edge 12 and two pairs of opposed projections, a first pair 14 provided at the first, upper, end (as shown in the Figures) and a second pair 16 at the lower end.

A loading lever 18 is mounted at one end thereof on a pivotal point 20, for movement between a first, loading position shown in FIG. 1 and a second position in FIG. 2 in which it lies flush with the portion of the holder linking the arm 8 with the handle 2.

Figure 7:
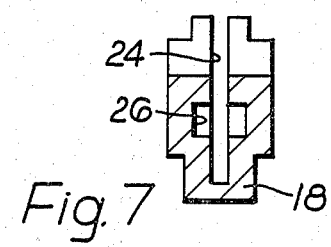

The lever 18 has a finger-engaging free end portion 22 and, spaced slightly inwardly from its opposite end and the pivot point 20, a cruciform slot 24 (more clearly shown in FIGS. 5 and 7) in grooves 26 of which are received the projections 16 of the blade 10. The entry into the slot 24 is facilitated by the provision of a projection 25 and the lever 18 which abuts a stop surface 28 of a recess 30 into which the lever is received in the operative condition of the saw. Abutment of stop surface 28 ensures that the lever is in the correct location to receive the lower end portion of the blade as it is pivoted into place about the projections 14. The projections 16 are held captive in the grooves 26 while the lever is moved manually into the position shown in FIG. 2 and thus tension is imparted. This is further explained below with reference to FIG. 4.

Figure 4:
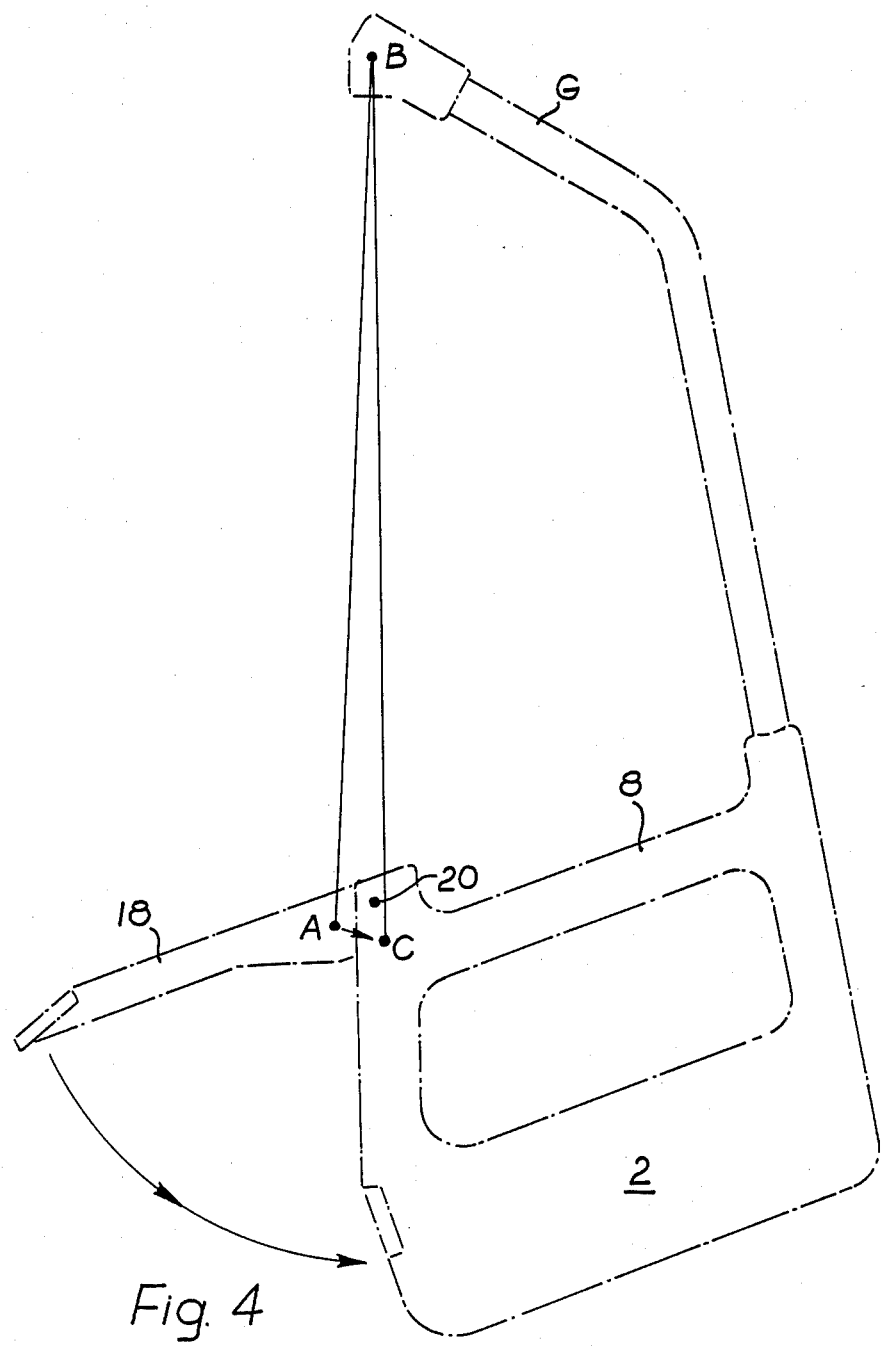
FIG. 4 is a diagram illustrating the movement partaken by the blade during loading.
Figure 5:
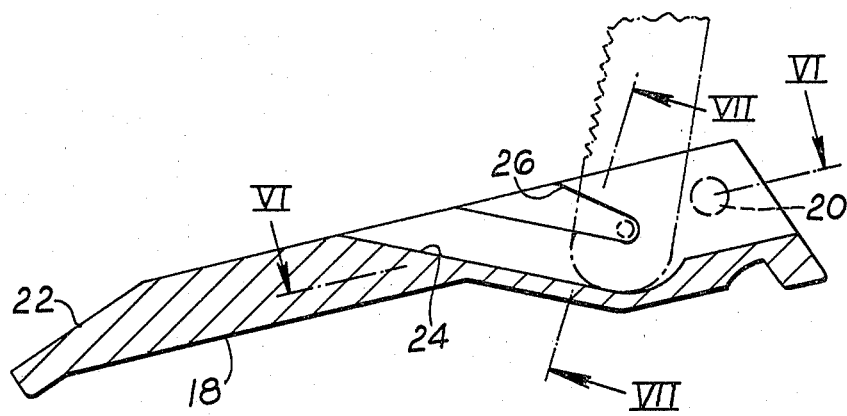
FIG. 5 is a longitudinal sectional view of the lever of the holder.
Figure 6:
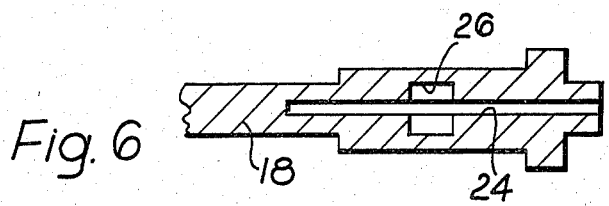
FIGS. 6 and 7 are sectional views on lines VI—VI and VII—VII respectively of FIG. 5.

In FIG. 4, the line AB represents the centre line of the blade 10 (between the projections 14 and 16) in the position shown in FIG. 1, that is, with lever 18 in its first position. Movement of the lever 18 about its pivot point 20 causes the point A (projection 16) to move to the position shown at C, which is "over-centre" with respect to the point 20. It will be observed that the distance BC is greater than AB and that therefore the desired degree of tension has been imparted to the blade 10.

We claim:

1. A blade-holder having a C-shaped portion with two ends parts, and adapted for use with a strip blade having an opposed pair of mounting projections provided at each of first and second end portions thereof and being arranged to span said C-shaped portion, said C-shaped portion comprises:

a first arm member with a T-slot provided therein to receive the opposed projections of the first end portion of the blade, a second arm member with a pivot mounting thereon, and a pivotal lever having an end portion mounted on said pivot mounting, a T-slot being provided on said lever so as to be inwardly spaced from its mounting and being adapted to receive the opposed projections of the second end portion of the blade when the lever is in a first, loading position, said lever further including an abutment surface projecting outwardly from its end portion adjacent said pivotal mounting, said abutment surface being arranged to contact the second arm member when the lever is in its first, loading, position and thereby to act as an end stop to ensure correct location of the T-slot of the lever when receiving the projections of the second end portions of the blade, movement of the lever from its first position into a second, operating, position causes the distance between the T-slot of the first arm member of the T-slot of the lever to increase, thereby enabling tension to be imparted to the blade.

2. A blade holder as claimed in claim 1, wherein the movement of the lever into its second position involves arcuate movement of the opposed projections of the second end of the blade into an over-centre condition with respect to the pivotal mounting of the lever, the arcuate movement of the blade end being described about the projections of the first end portion of the blade, received in the first-mentioned T-slot.

3. A blade holder as claimed in claim 1, wherein each T-slot comprises a portion of a cruciform slot.

* * * * *